US011038808B1

(12) United States Patent
Damani et al.

(10) Patent No.: US 11,038,808 B1
(45) Date of Patent: Jun. 15, 2021

(54) RESOURCE CAPACITY MANAGEMENT (71) Applicant: Amazon Technologies, Inc., Seattle, WA (US)

(72) Inventors: Rajeev Damani, Bellevue, WA (US); Damon Alexander, Seattle, WA (US); Al Ashkar, Seattle, WA (US); Yenchao Chua, Seattle, WA (US); Prashanth Paramanandan, Snoqualmie, WA (US); Saurabh Roongta, Redmond, WA (US); John Schroder, Bothell, WA (US); Jaymin Chinubhai Shah, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 142 days.

(21) Appl. No.: 16/171,013

(22) Filed: Oct. 25, 2018

(51) Int. Cl.
H04L 12/911 (2013.01)
H04L 12/741 (2013.01)
H04L 12/751 (2013.01)

(52) U.S. Cl.
CPC .............. H04L 47/70 (2013.01); H04L 45/02 (2013.01); H04L 45/745 (2013.01)

(58) Field of Classification Search
CPC ...... G06Q 10/087; G06Q 10/08; G06Q 10/06; G06Q 10/06311; G06Q 10/06312; G06Q 10/06316; G06Q 10/06315; G06Q 10/083; G06Q 10/08355; G06Q 10/02; G06Q 10/04; G06Q 10/063; G06Q 10/0631; G06Q 10/063116; G06Q 10/0637; G06Q 10/06375; G06Q 10/0835; G06Q 10/0836; G06Q 10/0837; G06Q 10/101; G06Q 10/1095; G06Q 30/06; G06Q 30/0601; G06Q 30/0633; G06Q 30/00; G06Q 30/0201; G06Q 30/0641; G06Q 30/0643; G06Q 30/0635; G06Q 30/016; G06Q 30/0202; G06Q 30/0617; G06Q 30/0623; G06Q 30/0627; G06Q 30/0631; G06Q 20/203; G06Q 40/12; G06Q 50/12; G06Q 50/28; H04L 47/70; H04L 45/02; H04L 45/745
See application file for complete search history.

(56) References Cited

U.S. PATENT DOCUMENTS 5,963,911 A 10/1999 Walker et al.
6,873,969 B2 * 3/2005 Stone .................... G06Q 10/00
705/27.1

(Continued)

FOREIGN PATENT DOCUMENTS

EP 326387 A1 1/2018

Primary Examiner — Glenton B Burgess
Assistant Examiner — Rachel J Hackenberg
(74) Attorney, Agent, or Firm — Knobbe, Martens, Olson & Bear, LLP (57) ABSTRACT A system and method for capacity management based on location and status of flexible (e.g., non-scheduled) service resources. Features are included to determine if the system can accept a request for a pick-up point (e.g., a restaurant, a quick order fulfillment center, grocery store, network location) based on the density, type and characteristics of the delivery resources in proximity (e.g., time and/or distance) to the pick-up point. The system also leverages historic delivery performance of the resources to assess whether to offer service or a service level for a given request.

20 Claims, 7 Drawing Sheets (56) References Cited

U.S. PATENT DOCUMENTS

| | | | |
|---|---|---|---|
| 9,269,103 B1* | 2/2016 | Kumar | G06Q 10/0835 |
| 10,380,522 B1 | 8/2019 | Brahms | |
| 2009/0167553 A1* | 7/2009 | Hong | G06Q 50/12 |
| | | | 340/4.61 |
| 2009/0323589 A1* | 12/2009 | Mahany | H04W 40/24 |
| | | | 370/328 |
| 2012/0323645 A1 | 12/2012 | Spiegal et al. | |
| 2014/0365250 A1* | 12/2014 | Ikeda | G06Q 10/02 |
| | | | 705/5 |
| 2015/0161564 A1* | 6/2015 | Sweeney | G06Q 10/063114 |
| | | | 705/338 |
| 2017/0270447 A1 | 9/2017 | Borean et al. | |
| 2018/0012151 A1* | 1/2018 | Wang | G06Q 10/0639 |
| 2018/0159921 A1* | 6/2018 | Brinig | H04L 67/16 |
| 2019/0122760 A1* | 4/2019 | Wang | G06Q 10/02 |
| 2019/0325374 A1* | 10/2019 | Pan | G06Q 10/02 |

\* cited by examiner

RESOURCE CAPACITY MANAGEMENT

BACKGROUND

The pool of resources which may be scheduled can be referred to as "on-demand resources" because the resources are available, upon request, to perform certain tasks. An on-demand resource may receive offers identifying tasks to be performed. The on-demand resource may accept or decline one or more task.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Described are systems and methods for capacity management based on location and status of flexible (e.g., non-scheduled, on-demand) service resources. Features are included to determine if the system can accept a request for an origination point (e.g., a restaurant, a quick order fulfillment center, grocery store, a merchant location, a network location) based on the density of resources, types of resources, and characteristics of the delivery resources in proximity (e.g., time and/or distance) to the origination point. The system also leverages historic delivery performance of the resources to assess whether to offer a service or a service level for a given request.

The systems and methods described may include detecting or determining the location of resources and the status of resources (e.g., delivery drivers, network equipment) to determine whether to accept a service request for an origination point. The determination may be based on the density, type, and characteristics of the resources in proximity to the origination point. For example, the proximity may be a defined arrival time radius of the resource relative to the origination point. This allows the system to accurately assess availability of resources at a specified location.

Some implementations schedule resources in advance of any specific request based on expected demand. In such instances, service requests are accepted based on the available resources remaining in the schedule. This approach has at least two drawbacks. First, scheduled resources are placed electronically via a network even if demand is less than expected. Idle resources typically means the system is expending resources to keep the resource available but not processing requests. Second, the system cannot accept service requests when all scheduled resources are utilized.

Some implementations include on-demand resource allocation to alleviate the drawbacks. A resource to respond to a service request can be acquired on-demand. For example, the system may accept an order and then source a driver from a pool of on-demand resources. This approach addresses the idling issue and allows the system to receive service requests when no resources are scheduled.

While the on-demand approach is more efficient than scheduled allocations and provides more capacity than existing implementations, there exists further issues with certain classes of service requests where a resource cannot be found to satisfy the requested time or location requirements. Features are described for new systems and methods that optimize the allocation of resources based on locations of the individual resources relative to a location where a resource is needed along with characteristics of the individual resources. These factors contribute to determining whether new service requests should be accepted, what timing expectations could be accepted, and to monitor resources in real-time to identify service requests have been confirmed. Once confirmed, any resources reserved for a service request may be released for use in servicing other requests.

For example, when an operator requests service, the system may identify a resource around the requested point of service. The system may generate a probability that the resource will accept and satisfy the service request based on historical acceptances. Because there may be multiple resources available, the system looks not only at an individual resource, but the set of resources which may provide the requested service. The system may aggregate individual acceptance probabilities of resources to generate a cumulative acceptance probability. Where the risk of acceptance is low (e.g., below an acceptance threshold), the system may offer or accept the service request. For example, if the threshold is 90% confidence of acceptance of the service request, the system may accept an order if the cumulative probability of resources around the origination point is at least 0.90. Once the system identifies a group of resources who meet the cumulative probability, the service request may be accepted. The group of resources may be reserved until the service request is assigned to a resource (e.g., offered to a driver and receipt of acceptance of the offer confirmed). In the case where the cumulative acceptance probability does not rise to the confidence level, the system may prohibit acceptance of the service request or seek alternate resource sources. For example, a schedule resource may be available to satisfy the service request.

The features described address the ambiguity and uncertainty with respect to individual resources' probability for accepting a service request, the density of such resources around origination points, time-of-day or day-of-week trends of volume, available scheduled resources, etc. and decides if a service request can be delivered according to an expected service level (e.g., within a time period).

Although some embodiments discussed may reference delivery resources for delivery tasks, the allocation optimization features may be applied to other task resources, human or machine, to perform discrete tasks at specified times or locations. For example, data transmissions at specific times may be offered to different transmission resources. Each partner may have unique capacity constraints that make it more likely that one resource is better suited to transmitting data during business hours (e.g., Monday through Friday 9 am-5 pm) while another is more likely to accept a transmission task during evenings or weekends.

Figure 1:
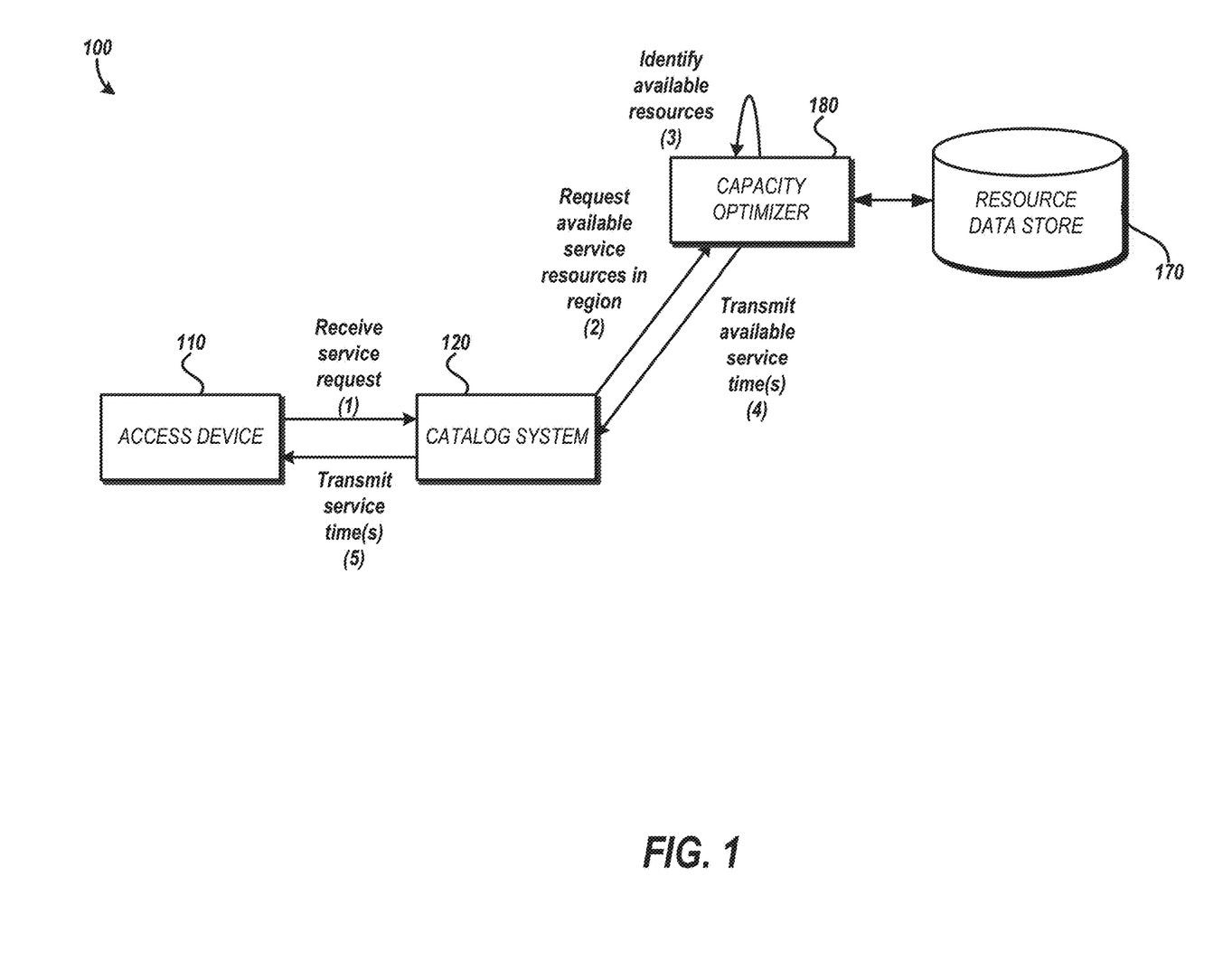
FIG. 1 is a pictorial diagram depicting a data flow for processing a service request, the service request being provided to a capacity optimizer that generates one or more estimated service times for the service request.

FIG. 1 is a pictorial diagram depicting a data flow for processing a service request, the service request being provided to a capacity optimizer that generates one or more estimated service times for the service request. As shown in the data flow 100, a service request may be included in a message received from an access device 110 by a catalog system 120. The service request may be received by the access device 110 through a user interface specifically configured to receive, transmit, and present service information. For example, the catalog system 120 may offer items or services which have specific transmission times. One example of an item is food. A food item may have a specific period of time during which the food item should be delivered. The food item may also be associated with a preparation time that represents how long the provider of the food item takes to produce the food item for transmission.

As part of selecting an item or service, the catalog system 120 may assess transmission options for the item or service. These options may be identified based in part on the service request. The catalog system 120 may request available service resources in a region associated with the service request. The region may be a point radius distance from the item or service origination point. In some implementations, the region may be specified as an isochrone from the origination point. An isochrone may define a control area within which resources can travel to the origin point within defined transit time. The time may be dynamically assessed based on mode of transport used by the resource. Isochrones may be preferred where a circular control area (e.g., point radium) ignores physical barriers and traffic conditions which could adversely impact a resources' ability to reach an origination point.

The catalog system 120 may provide the request to a capacity optimizer 180. The capacity optimizer 180 may identify resources available to satisfy the service request for the region. The identification may include identifying on-demand resources within the threshold distance or time of the origination point. The identification may include identifying scheduled resources within the threshold distance or time of the origination point. The identification may include generating probabilities that a given resource will satisfy the service request. In some instances, the probabilities for multiple resources may be aggregated to reach a threshold likelihood of satisfying the service request.

Assuming there are resources available to meet the threshold probability, the capacity optimizer 180 may provide the catalog system 120 one or more available service times for the service request. The service times may be generated based on the transit time from a resource's current location to the origination point and then from the origination point to a destination point. In some implementations, the service times may also consider preparation time for the item or service. The preparation time may be specified in the service request or dynamically generated by the catalog system 120 or capacity optimizer 180 based at least in part on the service request. For example, the origination point may be associated with an average preparation time. The service time may include time to dispatch the service request. For example, if an order is placed for an item, the catalog system 180 may transmit a request to a resource dispatch system to identify a delivery resource for the item. The process of sending requests to delivery resources, receiving responses, and assigning the item to a delivery resource may take time. This dispatch time can impact the service time. The dispatch time may be a static configuration or dynamically assessed based on historical dispatch times and or number of resources available. In some implementations, the dispatch time may vary based on location, item or service type, day of the week, time of day, or other factor detectable by the capacity optimizer 180.

The catalog system 120 may provide the transmit service time(s) to the access device 110. The service times may be presented via a user interface on the access device 110. This ensures that the service times offered are actually available for the service request rather than "best guesses" or based on historical resource capacity rather than current resource capacity. In some implementations, one service time may be provided.

Figure 2:
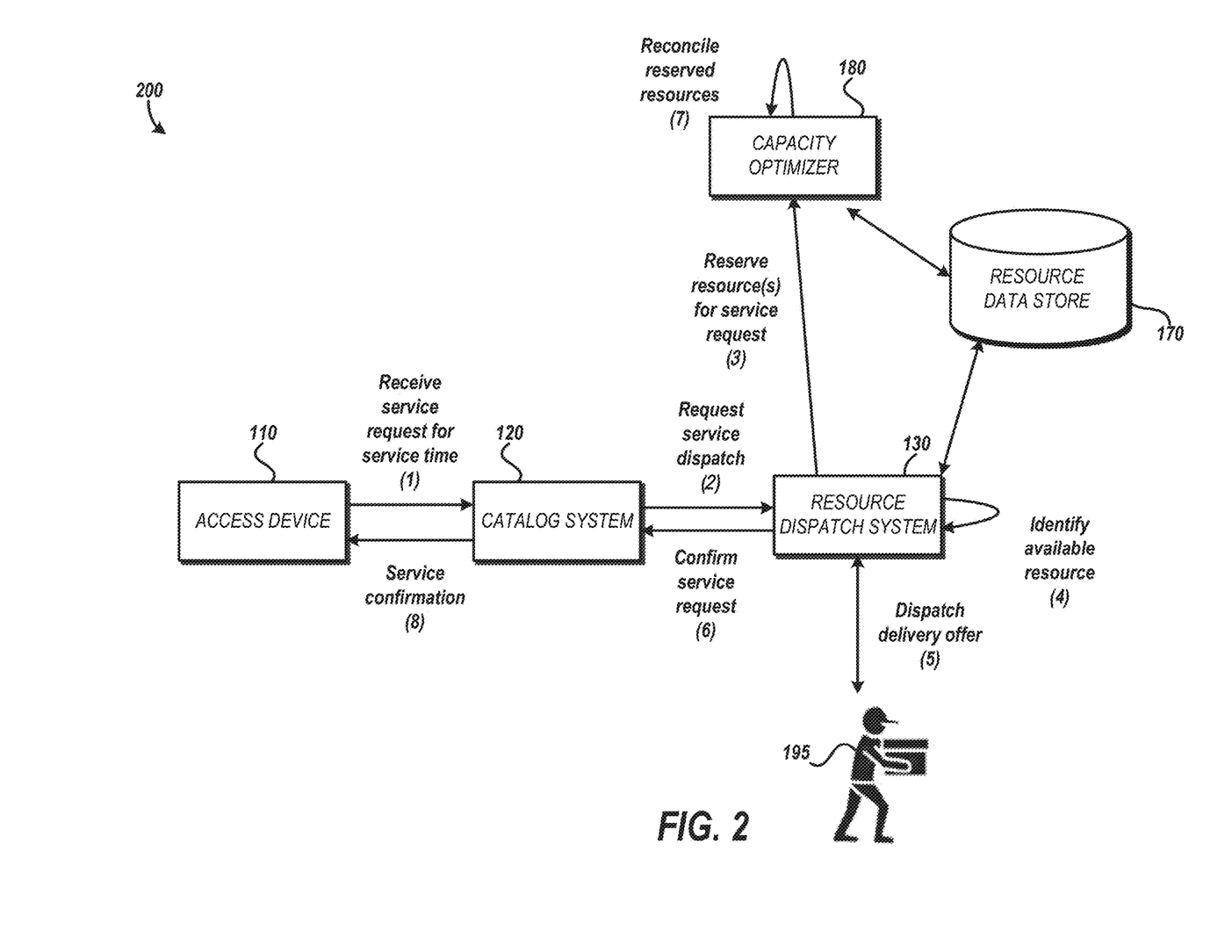
FIG. 2 is a pictorial diagram depicting a data flow for allocating a resource to a service request for a specified time.

FIG. 2 is a pictorial diagram depicting a data flow for allocating a resource to a service request for a specified time. Once presented with one or more potential service times, a user of the access device 110 may identify a desired service time. The selection may be provided via a control element presented via user interface. In the case where only one time is offered, the selection of the offered time may be inferred by a user submitted a request for the item or service.

Figure 3:
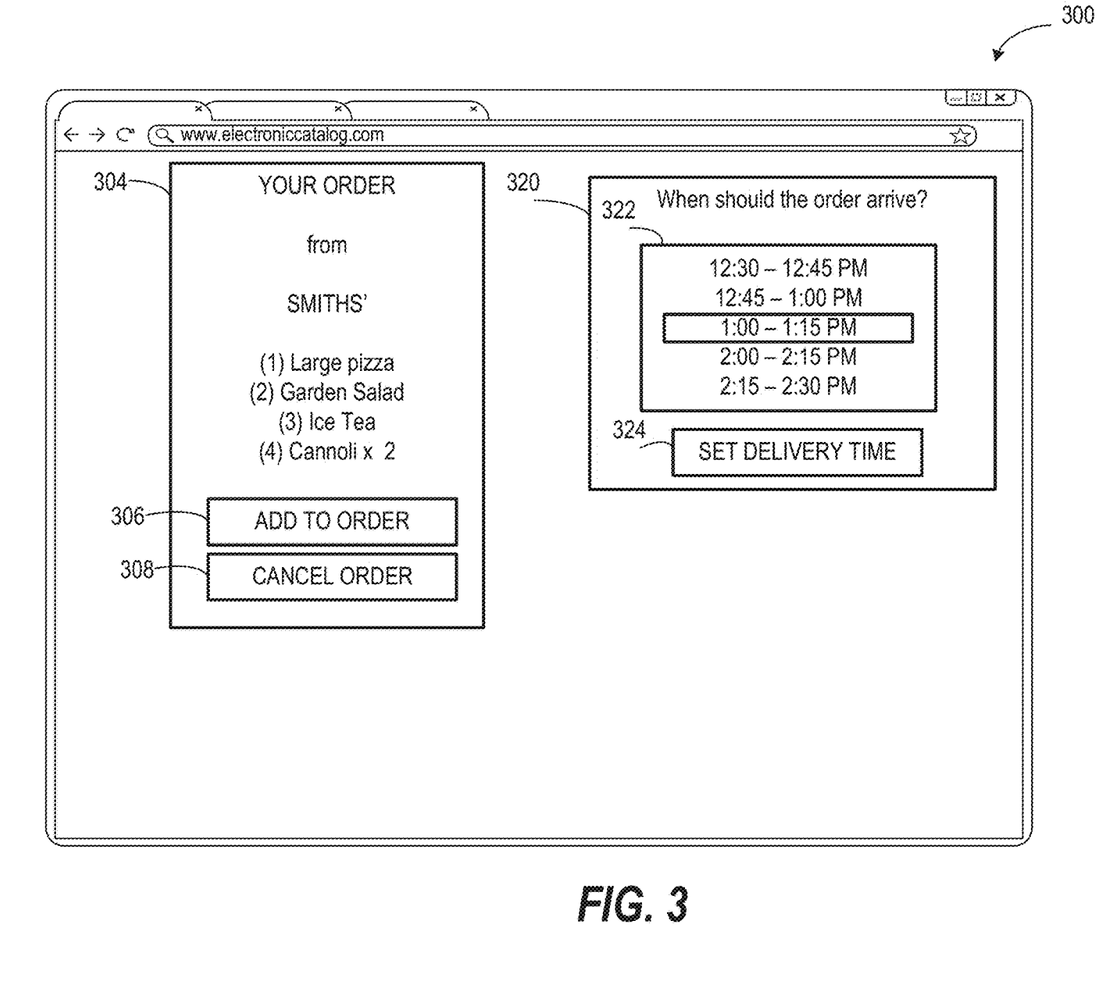
FIG. 3 is a pictorial diagram illustrating an example user interface for requesting a resource for a service request.

FIG. 3 is a pictorial diagram illustrating an example user interface for requesting a resource for a service request. The user interface 300 is presented via a web-browser but may be a custom user interface or integrated within an application. The user interface 300 includes an item request panel 304 and a service request panel 320. The item request panel 304 may include control elements to browse items, select items, or adjust items for a request. An add to order control element 306 may be activated to add a selected item to an existing order. A cancel order control element 308 may be activated to cancel an order.

As items are added to an order, the available service times presented via the service request panel 320 may be updated. For example, a traditional thin crust pizza may have a preparation time that is less than a deep dish pizza. In such instances, adding a deep dish pizza to an order may cause reassessment of the resources available at the restaurant when the deep dish pizza is available for delivery. The service request panel 320 may include a service time selector 322. Rather than presenting a full list of all times possible, the service time selector 322 presents the available times for service. In some implementations, the service request panel 320 may only include one service time to the user. By limiting presentation of possible times, the service request panel 320 conserves the resources and display space needed to render the user interface 300. The service request panel 320 may include a set service time control element 324. When activated, the catalog system may transmit a request to the resource dispatch system to identify a specific resource to satisfy the service request.

Similar features of the user interface may be implemented as an application programming interface (API). Such implementations may transmit options and received selections using machine readable messages. The AP allows resource optimization to be applied to service requests for non-physical items such as data transmission.

Returning to FIG. 2, the resource dispatch system 130 may receive the request for service dispatch. This request may indicate that an offered service has been accepted by a user. The resource dispatch system 130 (or the catalog system 120) may provide such indication to the capacity optimizer 180. The capacity optimizer 180 may use this information to reserve a quantity of delivery resources to satisfy the requested service. The reservation may include updating a record for each resource identified to indicate the capacity provided by the resources may be needed. Reservation does not necessarily mean that the resources reserved for a given service request will be offered or assigned to the service request. Reservation serves to block a portion of the resources to satisfy a potential service request.

The resource dispatch system 130 may identify one or more available resources for satisfying the request. The resources may include on-demand as well as scheduled resources. The identification may include generating probabilities of acceptance by a resource and transmitting a delivery offer to those resources likely to accept and complete the service request.

A delivery resource 195 may accept the service request. Accepting the service request may include receiving a message from a communication device associated with the delivery resource 195. The message may indicate acceptance of the service request. The acceptance may cause the resource dispatch system 130 to update a record for the delivery resource 195 in the resource data store 170. The update may indicate that the delivery resource 195 is scheduled to handle the service request for a period of time. This indication may be detected by the capacity optimizer 180. For example, the capacity optimizer 180 may detect an identifier for the service request being dispatched to the delivery resource 195. Once detected, the capacity optimizer 180 may reconcile reserved resources against resources dispatched for a service request.

Once the service request has been assigned, a resource allocation is no longer a predicted event, but a state of the environment. As such, the capacity optimizer 180 may release the resources reserved for the service request. Releasing the resources may include updating corresponding records for the delivery resources reserved by the capacity optimizer 180 to indicate that those resources are not reserved.

Reconciliation may also include updating any reservations that include a resource accepting a service request that would consume at least a portion of the time slot reserved. This allows the capacity optimizer 180 to respond to actual allocations as resources are adjusted, added, or removed. In the case where a reserved resource is removed, the reconciliation may include generating a new pool of resources to satisfy the service request.

The resource dispatch system 130 may then transmit a confirmation of the service timing to the catalog system 120. The service timing may include estimated arrival time of the delivery resource 195 at the origination point or at the destination. A confirmation of acceptance of the service request may be transmitted to the access device 110. The confirmation may include the service timing along with information about the delivery resource 195.

Figure 4:
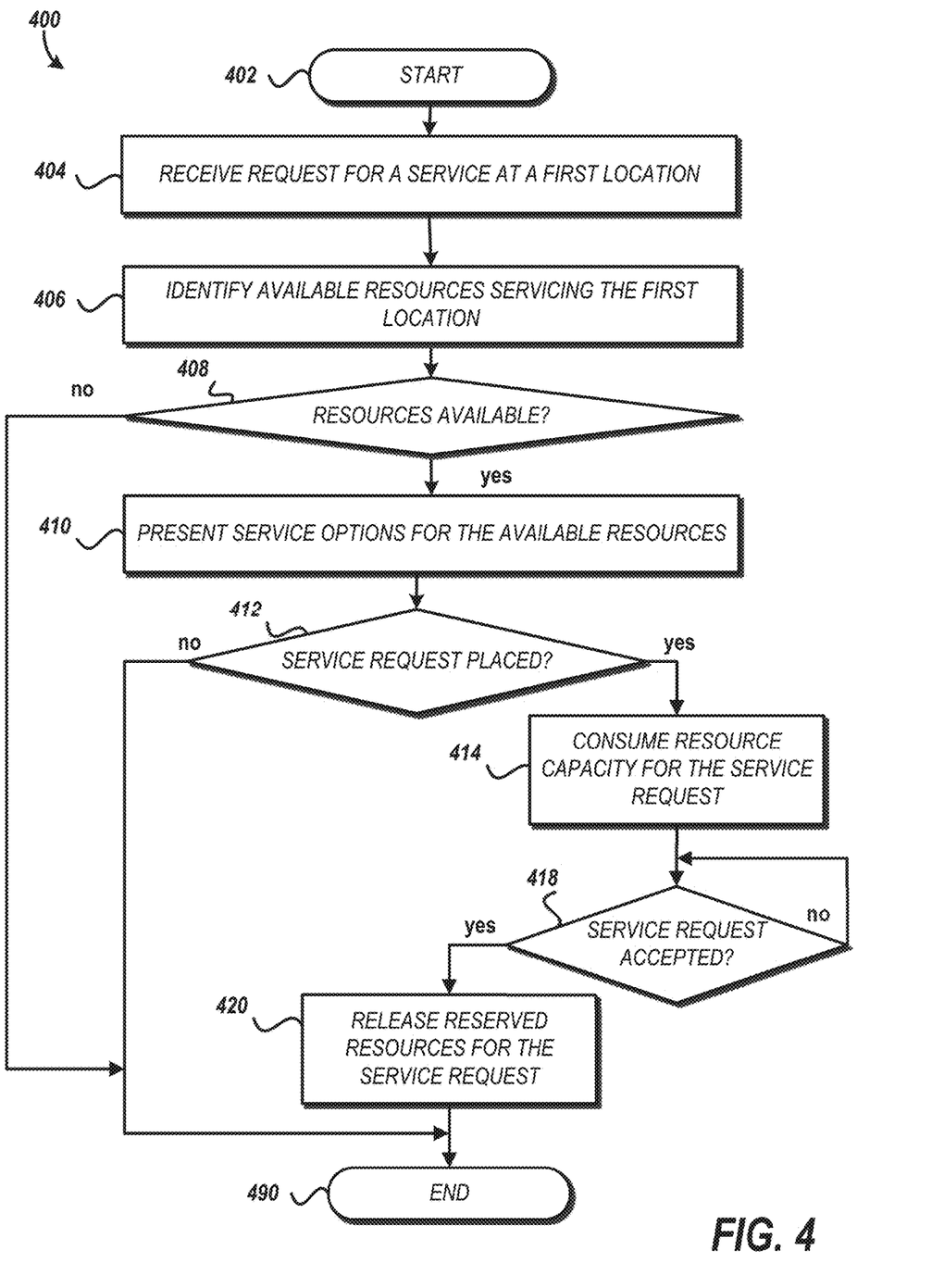
FIG. 4 is a flow diagram depicting an illustrative method of resource allocation for a service request.

FIG. 4 is a flow diagram depicting an illustrative method of resource allocation for a service request. The method 400 may be performed or coordinated, in whole or in part, by one or more of the devices described such as the capacity optimizer 180. The method 400 illustrates aspects of identifying, reserving, and releasing resources for a service request.

The method 400 begins at block 402. At block 404 the capacity optimizer may receive a request for a service at a first location. For example, the service may be transmission of an item from the first location to a second location. The request may be received from an access device or a catalog system in communication with an access device.

At block 406, the capacity optimizer may identify available resources servicing the first location. The resources may be identified from a resource data store. The resource may be identified based on, for example, a schedule for the resource or a status indicator for the resource. The available resources may be further filtered to remove those unable to reach the first location or unable to provide the service needed for the service request. For example, if a resource is located in a remote area, it may not be possible to travel from a current location to the first location in the required period of time. Distance or time criterion may be gauged using thresholds defined in a configuration accessible to the capacity optimizer. As another example, if the service requires specific capabilities such as capacity, bandwidth, transmission resources, radio access technology, or the like, some resources lacking the requisite capabilities may be excluded from further consideration.

Figure 5:
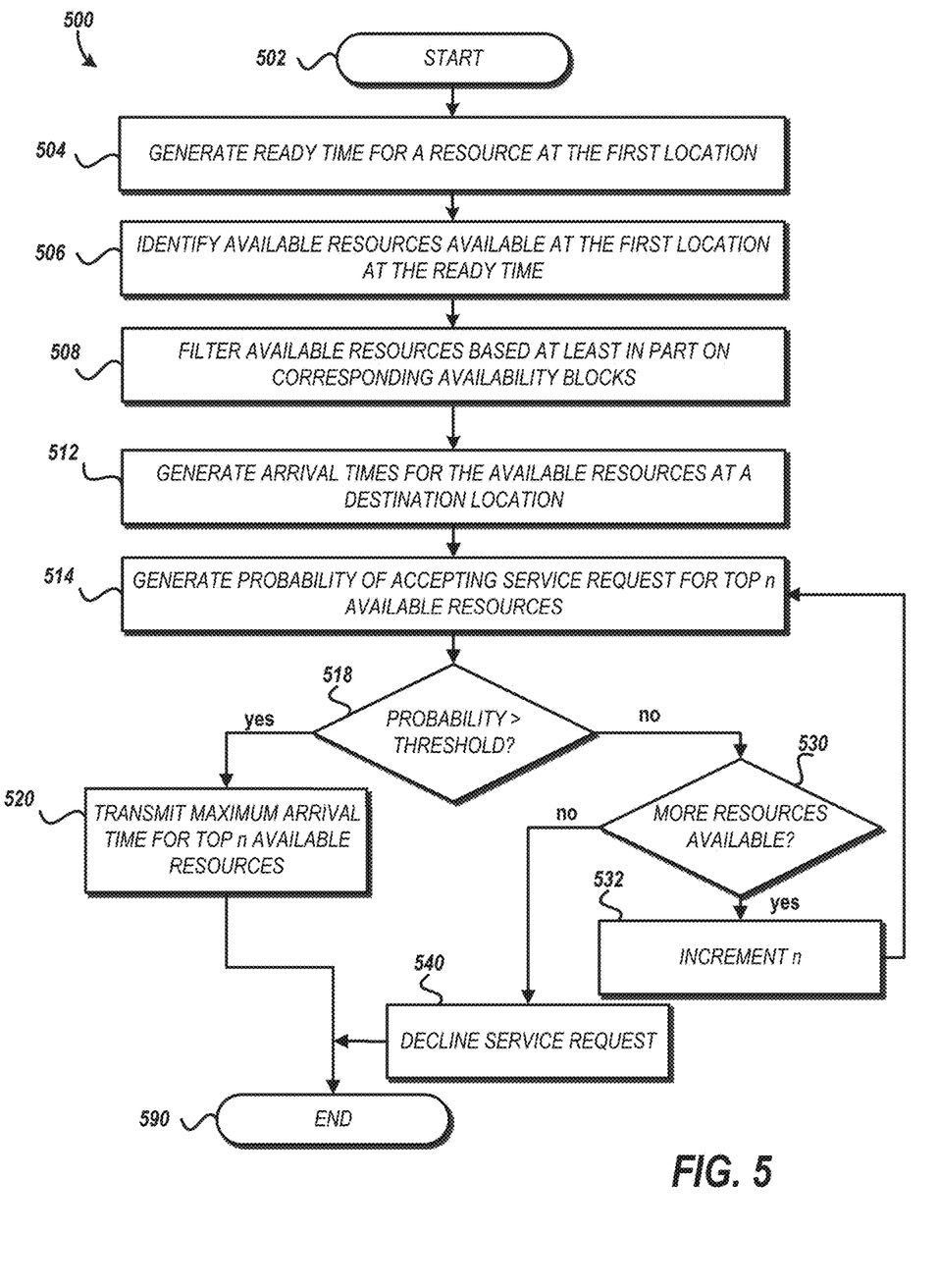
FIG. 5 is a flow diagram depicting an illustrative method of identifying resources for a service request.

FIG. 5 is a flow diagram depicting an illustrative method of identifying resources for a service request. The method 500 may be performed or coordinated, in whole or in part, by one or more of the devices described such as the capacity optimizer 180. The method 500 illustrates aspects of identifying resources and estimating service time based at least in part on characteristics of the reserved resources.

Acceptance probability for a resource can be determined at an individual resource level or at a geo-construct level (such as a service area, cluster, etc.). At a geo-construct level, a common acceptance probability may be assigned for resources within a geographic boundary, however, acceptance probability may vary for each resource. A geo-construct based model may also ignore input signals from a resource such as previous acceptance/rejections of dispatch requests, preferences (on-demand versus scheduled), price sensitivity, etc.

Given the impact of acceptance probability to effectively and accurately estimate service time, models which provide acceptance probability of an individual driver, given a set of parameters such as historical acceptances, pricing, pick-up point, destination, stem-in distance, time of the day and day of the week may be included. The model provides information related to at least one of three questions: (1) What is the current probability of acceptance, (2) what is the probability going to be in X minutes into the future, and (3) what is the price elasticity of the probabilities. Such models may be generated or trained using machine learning and historical resource behavior information.

The method 500 attempts to identify and reserve a resource close to the origination location so as to keep minimal transit time for the resource. The method 500 begins at block 502. At block 504, the capacity optimizer may generate a ready time for the resource at the first location. The ready time may indicate when an item is available for transfer to the resource at the first location.

At block 506, the capacity optimizer may identify available resources that can be available at the first location at the ready time. For example, if a resource is twenty minutes away from a location and the ready time is twenty minutes into the future, the resource may be deemed corresponding to the ready time. Conversely, if the resource if forty minutes away, the difference between the distance and ready time may be too great to be deemed corresponding. When assessing correspondence using a difference, the difference may be specified in a configuration accessible by the capacity optimizer. The difference may be specified in the service request, such as based on the first location, item type, or service requested.

At block 508, the available resource identified at block 506 may be filtered based on availability blocks. Resources may be available in predictable periods of time sometimes referred to as a time block. If an on-demand resource is about to start a new time block, it may be desirable to avoid including the resource because even a marginal spillover in utilization of the resource during the next time block may require expenditure for the entire time block. Similarly, if a scheduled resource is about to end their scheduled period, it may be desirable to avoid allocating this resource to a new task.

At block 512, the capacity optimizer may generate arrival times for each remaining available resource. The arrival time may indicate arrival at the first location. The arrival time may be based on a route for the resource from their current location to the first location. For resources currently dispatched, the arrival time may be based on a time to traverse a route from the end point of the currently dispatched task to the first location. The arrival time may consider the type of resource to account for different rates to traverse a route. The latest time of arrival represent an outer boundary for servicing the servicing request.

At block 514, the capacity optimizer may generate probabilities for each of n remaining available resources to accept the service request. The probability may be based on a machine learning model or other calculation based on the resource and/or service request. For example, a dispatch system may include a resource prediction interface which receives an identifier for a resource and returns a probability that the resource will accept a service request. The resource prediction interface may also receive details that may influence a resource's willingness to accept the service request such as location, time of day, day of week, or item or service type.

Table 1 shows an example representation of the available resources that may be available and corresponding estimated values for a service request for each resource.

TABLE 1

| Resource ID | Est. Arrival Time | Acceptance Prob. | Time Block Availability |
|---|---|---|---|
| D1 | 17:36 | 0.32 | 120 mins |
| D2 | 17:39 | 0.24 | 120 mins |
| D3 | 17:39 | 0.41 | 150 mins |
| D4 | 17:40 | 0.51 | 90 mins |
| D5 | 17:42 | 0.17 | 120 mins |
| D6 | 17:44 | 0.29 | 150 mins |
| D7 | 17:45 | 0.278 | 120 mins |

The probabilities generated at block 514 may be accumulated to reach a target probability such that the service request can be accepted by the catalog system with a degree of confidence that the promised service timing is achievable. At block 518, the cumulative probability for the probabilities generated at block 514 is compared to a threshold. If the cumulative probability meets or exceeds the threshold, the method 500 may proceed to block 520. At block 520, the capacity optimizer may transmit the maximum arrival time for the n available resources. The arrival time may serve as an indicator that the service request can be satisfied. Additional timing options may be included along with the maximum arrival time to provide additional service options to the user. The method 500 may then end at block 590.

Returning to block 518, if the n resources do not provide the threshold cumulative probability, the method 500 may determine at block 530 whether more resources are available. The determination may include comparing n to the size of the available resources from block 512. If the determination is negative, the method 500 may transmit a message declining the service request 540. The message may include an identifier for the service request to allow association of the response with an access device. If the determination at block 530 is affirmative, at block 532, n may be incremented to expand the pool of resources considered. This effectively expands the scope of possible resources that could accept the service request. Once incremented, the method 500 may return to block 514 as described to generate probabilities anew for at least the incrementally added resources. In some implementations, it may be desirable to regenerate probabilities for all n resources to account for dynamic changes in the resource, its availability, and such.

Table 2 illustrates four iterations of assessment of a cumulative capacity to determine whether the service request can be satisfied using one or more of the available resources from Table 1 at a threshold probability of 0.9.

TABLE 2

| Cumulative Probability | Result at block 518 |
|---|---|
| D1 | Negative |
| D1, D2 | Negative |
| D1, D2, D3 | Negative |
| D1, D2, D3, D4 | Affirmative |

In some implementations, the method 500 may consider resources of the on-demand type. In such instances, before declining the service request, the method 500 may determine whether scheduled resources are available to satisfy the request. Since the probability of a scheduled resource to accept a service request is 1.0 (e.g., the resource is scheduled to perform service during an allocated time), if a scheduled resource is available, it may be reserved for the service request as described.

Returning to FIG. 4, at block 408, the capacity optimizer may determine whether resources are available after applying the filtering criterion. If there are no resource available, then the service request cannot be fulfilled at the requested service level with the currently set of resources. The method 400 may proceed to end at block 490. It will be understood, that the method 400 may provide feedback to the requesting device indicating alternative service options such as a longer wait time or different service. For example, if the service is a restaurant, the method 400 may indicate that the requested restaurant timing requirements are too short for the currently available resources but another restaurant with longer preparation times may be available.

Returning to block 408, if the capacity optimizer determines that resources are available for the service request, at block 410, the service options may be presented for the available resources for the service request. The service options may include estimated arrival times at the second location. The service options may include resource transport mode (e.g., cellular, WiFi®, car, bicycle, pedestrian, air, etc.) used for the service request. The service options may be presented via a user interface such as shown in FIG. 3.

At block 412, the capacity optimizer may determination whether the service request has been placed. Cancellation may be detected through a message received from the catalog system. In some implementations, a service request may be placed by a user submitting an authorization to proceed with the service request. In such instances, the authorization may include time information to indicate when the authorization was provided. Another factor in the determination at block 412 may include session information. An access device may establish a session with the catalog system as the access device adjusts a service request. The session may end if the access device stops sending messages after a period of time or if an application disconnects from the catalog system. In such instances, the session expiration event may indicate that a service request has not been placed.

If the determination at block 412 is negative, the method 400 may end at block 490 as described.

If the determination at block 412 is affirmative, the service request may be confirmed such as by receiving confirmation message from a user or access device. At block 414, the capacity optimizer may update the resource data store to indicate allocation of the resource to the service request. This indicates that the service provided by the resources is consumed to meet the expected service level. The update may include updating a record for one or more resources needed to meet the cumulative probability threshold. In some instances, the resources reserved at block 414 may be different than the resources identified at block 406. For example, time may elapse between the presentation of service options (e.g., block 410) and placing an order. During this time, the quantity or location of resources may change. Accordingly, the consuming of resources at block 414 may include identifying resources again and then reserving the identified resources for the order.

A resource dispatch system may transmit offers to resources for the service request. A response may be received from a resource to accept the service request. The acceptance may accompany an update to the resource data store to associate the service request with a resource. Since the hypothetical reserved pool of resources is now realized as the resource responding to the service request, the reserved resources associated with the service request may be released. The assessment and release of reserved resources may be referred to as resource reconciliation.

At block 418, the capacity optimizer may determine whether the service request has been accepted. The determination may include maintaining a list of pending service requests and querying the resource data store for an indicator of acceptance for the service request. If not, the method 400 may return to block 406 to reassess the available resource pool. Because resource availability may have changed since a prior assessment for the service request, the method 400 may regenerate service options and confirm the service request.

If the determination at block 418 is affirmative, the method 400 may proceed to block 420. At block 420, the capacity optimizer may generate and cause presentation of service performance information such as estimated time of pick-up, arrival, delivery, etc. Generating the estimates may include identifying a current location of the resource and a route to the origination point along with a time estimate to traverse the route. The generation may include identifying a route from the origination point to the destination location. This may also include a time estimate to traverse the route. The method 400 may then end at block 490 as described.

The features described may be used to allocate resources for processing a physical object (e.g., food, books, etc.). Allocation may include adjusting an operational state of a processing equipment to direct the item to the destination location. In an electronic network, the capacity optimizer may alter resources such as a router, gateway, or network translation device to direct packets (rather than physical objects) to a desired destination. For example, a forwarding table entry may be added to a forwarding table to configure a network controller to direct packets from a source location to a destination location via a specific network.

Figure 6:
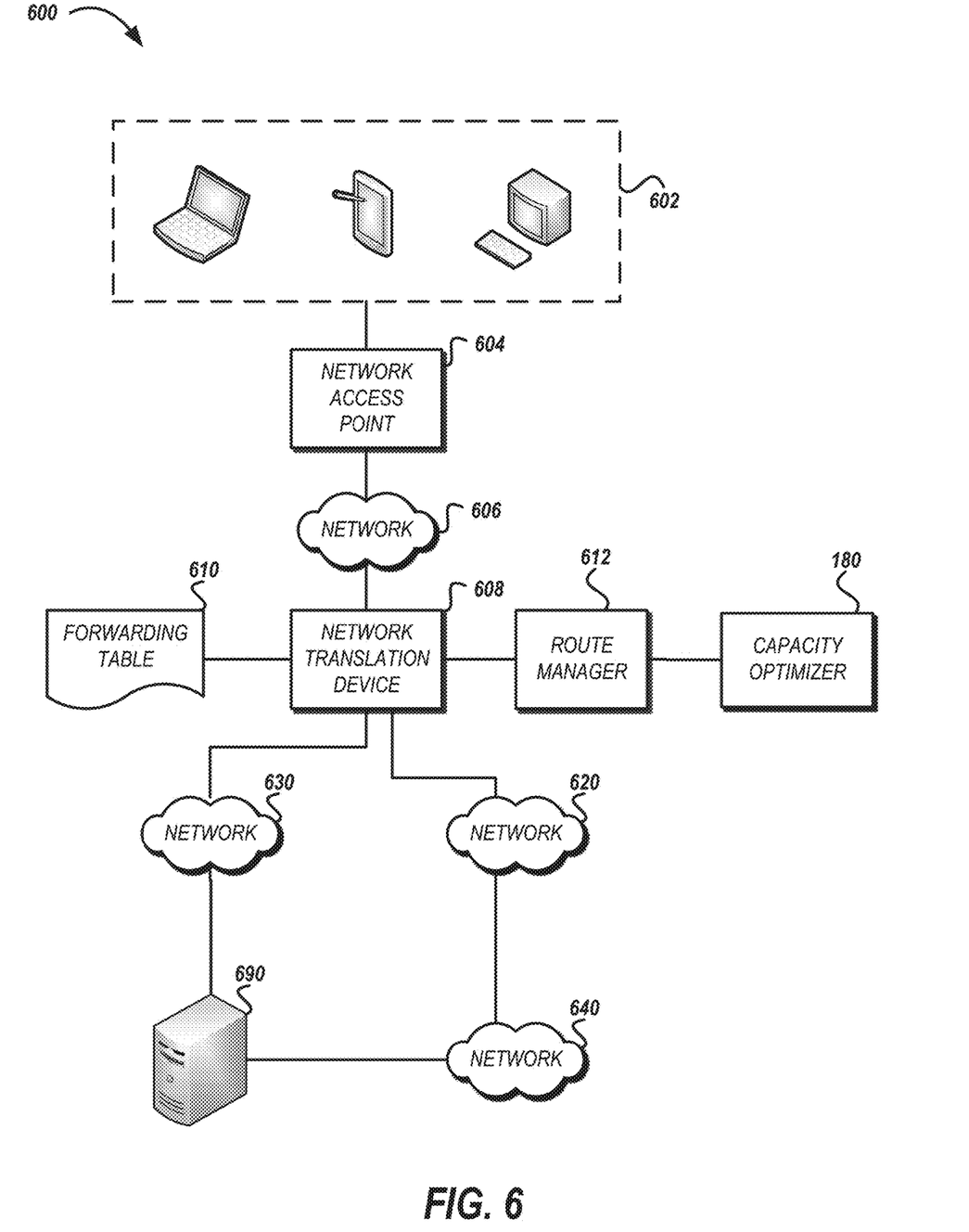
FIG. 6 is a block diagram depicting another illustrative operating environment for a routing control system.

FIG. 6 is a block diagram depicting another illustrative operating environment for service resource optimization. The environment 600 of FIG. 6 represents a packet data routing network. The environment 600 may feature a collection of networks (e.g., network 606, network 630, network 620, and network 640). The networks may be the same type of network (e.g., wireless Long Term Evolution networks) or different types of networks (e.g., wired local area network and a wireless Global System for Mobile Communications network). The networks shown in FIG. 6 may be any wired network, wireless network, or combination thereof. In addition, the networks may be a personal area network, local area network, wide area network, cable network, satellite network, cellular telephone network, etc. or combination thereof. For example, the networks may be a publicly accessible network of linked networks, possibly operated by various distinct parties, such as the Internet. In some embodiments, the networks may be a private or semi-private network, such as a corporate or university intranet. The networks may include one or more wireless networks, such as a Global System for Mobile Communications (GSM) network, a Code Division Multiple Access (CDMA) network, a Long Term Evolution (LTE) network, or some other type of wireless network. The networks may use protocols and components for communicating via the Internet or any of the other aforementioned types of networks.

As shown, the environment 600 may include transmission resources that can be used to route transmissions from an access device 602 to a destination server 690. For example, a packet may travel from the network 606 to the network 630 and then to the destination server 690. An alternate route could be from the network 606 to the network 620 then to the network 640 and finally to the destination server 690. As with routing physical items, determining which route is the most efficient can be determined on a packet by packet basis (e.g., greedy). Under this style of routing, an optimal route for a current packet may not be an optimal route for the entire system or the actual or requested service demand (e.g., time or location). Accordingly, it may be desirable to include the service resource optimization features described to dynamically adjust routes through adjustments to the network resources included in the environment 600 for transmissions.

The environment 600 may include one or more access devices. The access device 602 may be an electronic communication device configured to transmit or receive packet data via the network 606. Examples of such electronic communication devices include laptop computers, tablet computers, smartphones, desktop computers, servers, wearable devices (e.g., smartwatch or smartglasses), and the like.

The access device 602 may access the network 606 via a network access point 604. The network access point 604 may be a device configured to control connectivity of the access device 602 to the network 606. For example the network access point 604 may be a wireless access point that allows a Wi-Fi enabled access device to connect to the network 606.

The network 606 may include a network translation device 604. The network translation device 608 may be configured to direct communications addressed to destinations outside the network 606. The network translation device 608 may include the capacity optimizer 180 for identifying one or more resources for routing a data packet from the access device 602 to another location in the environment 600 at a specified time, such as a node associated with one of: the network 606, the network 630, the network 620, or the network 640.

In FIG. 6, the capacity optimizer 180 may receive a service request for transmission of one or more data packets from a first location to a second location at a particular time. The capacity optimizer 180 may receive the request via an API The availability of resources and possible transmission times may be generated by a capacity optimizer using the resource allocation features described herein. The route manager 612 may store the routing information in a forwarding table 610. For example, the route manager 612 may direct data packets to a preferred destination by transmitting entries to the network translation device 608 that indicate where to send traffic with a specified destination address (e.g., the address of the destination server 690). The network translation device 608 may receive different forwarding entries from the forwarding table 610, such that data for one communication can be sent to the destination server 690 through the network 630, while another communication may be sent to the destination server 690 through the network 620 and the network 640. In some cases, packets with the same source or destination may be sent by different networks based on the associated virtual network. The entries included in the forwarding table 610 may be provided for specific data packets (e.g., destination, source, device type, packet data content type (e.g., text, video, audio, etc.)), for specific times, or configured for all packets associated with the source location (e.g., the network 606).

Other ways of communicating the resource allocation to direct data packets through a network include: tagging of packets, such as by Multiprotocol Label Switching (MPLS); MAC stacking where a packet could have multiple MAC addresses, the first MAC address for a substrate component, such as a switch, and a second MAC address for a next component either on the "fast" or the "slow" transmission path; and using Network Address Translation (NAT) devices on both ends of a network in order to redirect traffic into the network, such as by spoofing or altering an destination address for an incoming packing and/or altering an the source address of an outgoing packet. In some embodiments, the route manager 612 may generate control signals or messages for transmission to one or more network resources to coordinate service in the environment 600 according to the expected and planned transmissions.

In generating routes, the route manager 612 may optimize allocation of resource based on allocation information from the capacity optimizer 180. For example, the capacity optimizer 180 may include allocation adjustments for network resources. The capacity optimizer 180 may provide the allocation adjustment to facilitate identification of a route that is likely to meet requested service level (e.g., timing or location requirements).

Figure 7:
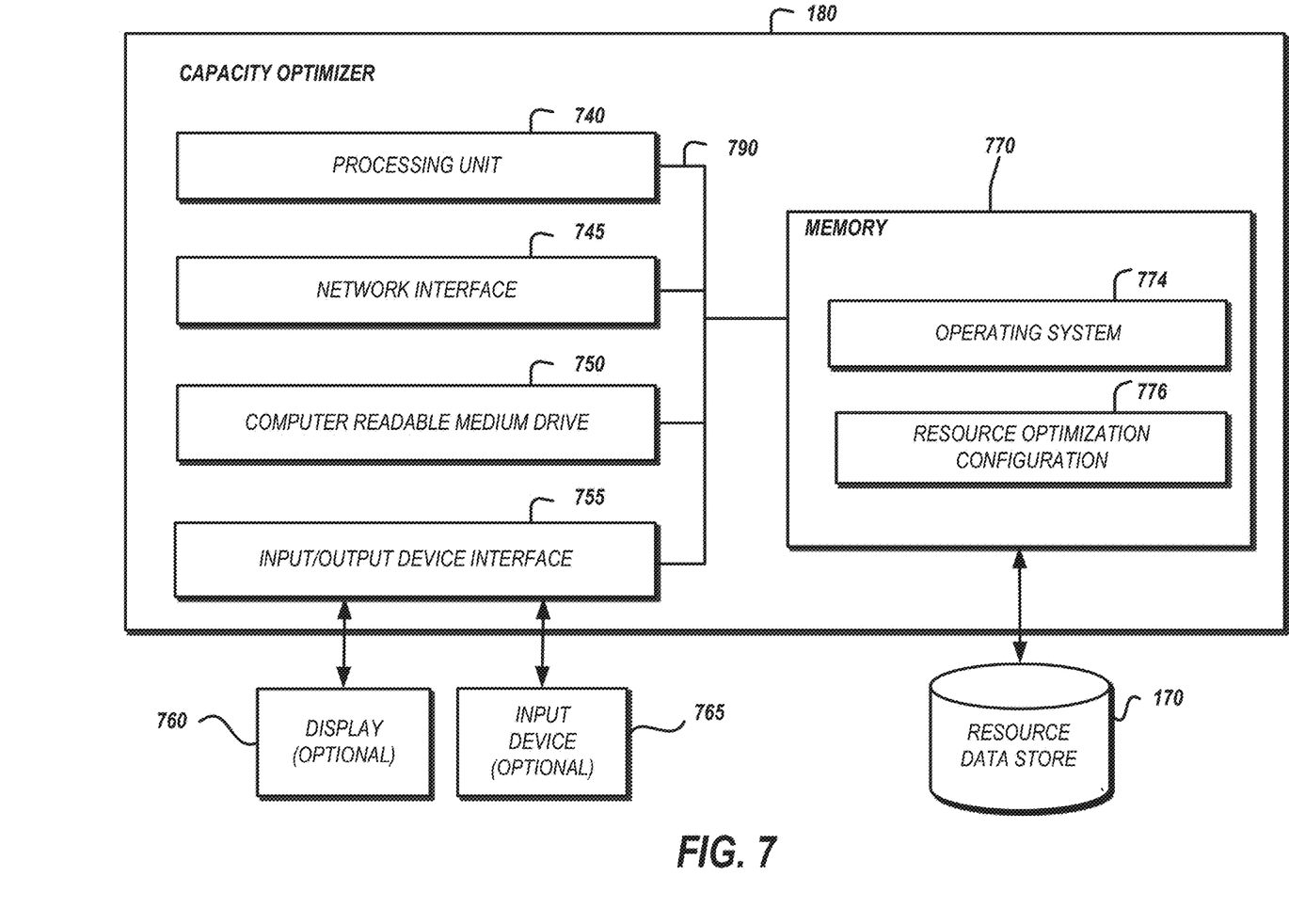
FIG. 7 is a block diagram depicting an illustrative architecture for a computing device for service resource optimization.

FIG. 7 is a block diagram depicting an illustrative architecture for a computing device for service resource optimization. The capacity optimizer 180 can be a server or other computing device, and can comprise a processing unit 740, a network interface 745, a computer readable medium drive 750, an input/output device interface 755, and a memory 770. The network interface 755 can provide connectivity to one or more networks or computing systems such as the network 204 shown in FIG. 2. The processing unit 740 can receive information and instructions from other computing systems or services via the network interface 745. The network interface 745 can also store data directly to memory 770. The processing unit 740 can communicate to and from memory 770 and output information to an optional display 760 via the input/output device interface 755. The input/output device interface 755 can also accept input from the optional input device 765, such as a keyboard, mouse, digital pen, microphone, mass storage device, etc.

The memory 770 generally includes RAM, ROM, and/or other persistent, non-transitory computer readable media. The memory 770 can store an operating system 774 that provides computer program instructions for use by the processing unit 740 or other elements included in the computing device in the general administration and operation of the routing control system 220. The memory 770 can further include computer program instructions and other information for implementing aspects of the present disclosure.

For example, in one embodiment, the memory 770 includes a routing control configuration 776. The routing control configuration 776 may include thresholds or predetermined values to support the resource allocation operations described herein. The routing control configuration 776 may store specific values for a given configuration. For example, the threshold for determining a cumulative acceptance probability may be specified as an absolute value (e.g., 0.9). Some implementations may include different probabilities for different service requests. The values for respective service requests may be provided in a look up table indexed by one or more characteristics of a request type, an item or network resource such as item type (e.g., book, music, movie, clothing, text data packet, digital music file, perishables, voice data packet, real-time streaming data packet, etc.), service type (e.g., food delivery, item delivery, data transmission), resource type (e.g., fulfillment center, processing equipment, mobile delivery drive unit, network switch, network router, etc.), or an identifier for the item or network resource.

Rather than storing express values for a particular configuration element, the routing control configuration 776 may, in some implementations, store information that allows the capacity optimizer 180 to obtain a dynamically generated value for the given configuration element. For example, the identity of the default demand forecast system may be specified as a network location (e.g., URL) in conjunction with username and password information to access the network location to obtain the resource data that should be used by the capacity optimizer 180.

The memory 770 may also include or communicate with one or more auxiliary data stores, such as the resource data store 170. The resource data store 170 may electronically store data regarding resources reserved by the capacity optimizer 180 or allocated by the resource dispatch system 130.

The elements included in the capacity optimizer 180 may be coupled by a bus 790. The bus 790 may be a data bus, communication bus, or other bus mechanism to enable the various components of the capacity optimizer 180 to exchange information.

In some embodiments, the capacity optimizer 180 may include additional or fewer components than are shown in FIG. 7. For example, a capacity optimizer may include more than one processing unit 740 or computer readable medium drive 750. In another example, a resource optimizer may not be coupled to a display (e.g., the display 760) or an input device (e.g., the input device 765). In some embodiments, two or more capacity optimizers may together form a computer system for executing features of the present disclosure.

A capacity optimizer, such as the capacity optimizer 180, may be configured to perform aspects of the resource reservation and optimization described. For example, under control of one or more processors such as the processing unit 470, the capacity optimizer may receive, from a communication device, a request for service from a first location; identify, from a resource data store, resources within a threshold distance to the first location and associated with records in the resource data store including information indicating the resource is unreserved; estimate a probability that a portion of the resources will accept an offer to provide the service; determine that the probability corresponds to an acceptance threshold; update respective records for the portion of the resources in the resource data store to indicate the portion of the resources are reserved; cause transmission of an offer for the service to a device associated with a resource; detect acceptance of the offer from the resource; and update the respective records for the portion of the resources in the resource data store to indicate that resources included in the portion of the resources are unreserved.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a capacity optimizer, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A capacity optimizer can be or include a microprocessor, but in the alternative, the capacity optimizer can be or include a controller, microcontroller, or state machine, combinations of the same, or the like configured to estimate and communicate allocation information. A capacity optimizer can include electrical circuitry configured to process computer-executable instructions. Although described herein primarily with respect to digital technology, a capacity optimizer may also include primarily analog components. For example, some or all of the allocation algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a capacity optimizer, or in a combination of the two. A software module can reside in RAM memory, flash memory. ROM memory, EPROM memory, EEPROM memory, registers, hard disk, a removable disk, a CD-ROM, or any other form of a non-transitory computer-readable storage medium. An illustrative storage medium can be coupled to the capacity optimizer such that the capacity optimizer can read information from, and write information to, the storage medium. In the alternative, the storage medium can be integral to the capacity optimizer. The capacity optimizer and the storage medium can reside in an ASIC. The ASIC can reside in a user terminal. In the alternative, the capacity optimizer and the storage medium can reside as discrete components in a user terminal (e.g., planning device).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), FLASH™, JAVA™, .NET™, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of allocating resources to a service request:
   under control of one or more processors:
   receiving, from a communication device, a first request for a service at a first location;
   identifying, from a resource data store, a first plurality of resources within a threshold distance of the first location, wherein each resource of the first plurality of resources is associated with:
   a record that includes reservation information indicating that the resource is unreserved, and
   an individual resource probability of a plurality of individual resource probabilities that the resource will accept an offer to fulfill the first request wherein the individual resource probability is generated by a machine learning model trained on historical resource behavior information;
   estimating, by the machine learning model, a cumulative probability that at least one resource of a subset of the first plurality of resources will accept the offer to fulfill the first request, wherein the cumulative probability is estimated based at least in part on aggregating a subset of the plurality of individual resource probabilities associated with the subset of the first plurality of resources;
   determining that the cumulative probability corresponds to an acceptance threshold;
   based at least in part on determining that the cumulative probability corresponds to the acceptance threshold, accepting the first request;
   reserving the subset of the first plurality of resources, wherein reserving the subset of the first plurality of resources comprises updating the record for each resource of the subset of the first plurality of resources to indicate that the resource is reserved;

causing transmission of an offer to fulfill the service to a device associated with a first resource of the subset of the first plurality of resources;

detecting acceptance of the offer by the first resource; and based at least in part on detecting acceptance of the offer by the first resource, releasing a second resource of the subset of the first plurality of resources, wherein releasing the second resource comprises updating the record of the second resource to indicate that the second resource is unreserved.

2. The computer-implemented method of claim 1, wherein the plurality of individual resource probabilities comprises a plurality of first individual resource probabilities, the computer-implemented method further comprising, prior to detecting the acceptance:

receiving a second request for a second service at the first location; and identifying, from the resource data store, a second plurality of resources within the threshold distance of the first location, wherein each resource of the second plurality of resources is associated with:

a second record that includes reservation information indicating that the resource of the second plurality of resources is unreserved, and a second individual resource probability of a plurality of second individual resource probabilities that the resource of the second plurality of resources will accept a second offer to fulfill the second request, wherein the second individual resource probability is generated by the machine learning model, wherein the first plurality of resources is different from the second plurality of resources.

3. The computer-implemented method of claim 1, wherein the service is associated with an item, the computer-implemented method further comprising:

estimating a preparation time that the item will be available at the first location based at least in part on a preparation period associated with the first location; and for each resource of the first plurality of resources, generating a time of arrival at the first location for the resource based at least in part on a current location of the resource and the first location, wherein, for each resource of the subset of the first plurality of resources, the time of arrival corresponds to the preparation time.

4. The computer-implemented method of claim 1, wherein the plurality of individual resource probabilities comprises a plurality of first individual resource probabilities, wherein the cumulative probability comprises a first cumulative probability, the computer-implemented method further comprising:

identifying, from the resource data store, an initial plurality of resources within the threshold distance of the first location, wherein each resource of the initial plurality of resources is associated with:

a second record that includes reservation information indicating that the resource of the initial plurality of resources is unreserved, and a second individual resource probability of a plurality of second individual resource probabilities that the resource of the initial plurality of resources will accept the offer to fulfill the first request, wherein the second individual resource probability is generated by the machine learning model;

estimating, by the machine learning model, a second cumulative probability that at least one resource of a subset of the initial plurality of resources will accept the offer to fulfill the first request, wherein the second cumulative probability is estimated based at least in part on aggregating a subset of the plurality of second individual resource probabilities associated with the subset of the initial plurality of resources;

determining that the second cumulative probability corresponds to the acceptance threshold;

for each resource of the subset of the initial plurality of resources, identifying a time of arrival at the first location;

determining based at least in part on a comparision of the time of arrival for each resource of the subset of the initial plurality of resources, that a first time of arrival of a third resource of the subset of the initial plurality of resources is farthest from a current time; and causing display, via the communication device, of the time of arrival of the third resource, wherein the first request received from the communication device is associated with the time of arrival of the third resource.

5. A computer-implemented method of allocating resources to a service request:

under control of one or more processors:

receiving, from a communication device, a first request for a service at a first location;

identifying, from a data store, a first plurality of resources within a threshold distance of the first location, wherein each resource of the first plurality of resources is associated with an individual resource probability of a plurality of individual resource probabilities that the resource will accept an offer to fulfill the first request, wherein the individual resource probability is generated by a machine learning model trained on historical resource behavior information;

estimating, by the machine learning model, a cumulative probability that at least one resource of a subset of the first plurality of resources will accept the offer to fulfill the first request, wherein the cumulative probability is estimated based at least in part on aggregating a subset of the plurality of individual resource probabilities associated with the subset of the first plurality of resources;

determining that the cumulative probability corresponds to an acceptance threshold;

based at least in part on determining that the cumulative probability corresponds to the acceptance threshold, reserving the subset of the first plurality of resources;

transmitting, to the communication device, availability of at least a first resource and a second resource of the subset of the first plurality of resources to satisfy the first request;

detecting confirmation of the first request by the communication device; and based at least in part on detecting confirmation of the first request by the communication device, releasing a third resource of the subset of the first plurality of resources, wherein releasing the third resource comprises updating a record of the third resource to indicate that the third resource is unreserved.

6. The computer-implemented method of claim 5, wherein the plurality of individual resource probabilities comprises a plurality of first individual resource probabilities, the computer-implemented method further comprising, prior to detecting the confirmation:

receiving a second request for the service at the first location; and identifying, from the data store, a second plurality of resources within the threshold distance of the first location, wherein each resource of the second plurality of resources is associated with a second individual resource probability of a plurality of second individual resource probabilities that the resource of the second plurality of resources will accept the offer to fulfill the second request, wherein the second individual resource probability is generated by the machine learning model, wherein the second plurality of resources is different from the first plurality of resources.

7. The computer-implemented method of claim 5, further comprising:

estimating a preparation time that an item associated with the first request will be available at the first location based at least in part on a preparation period associated with the first location; and for each resource of the first plurality of resources, generating a time of arrival at the first location for the resource based at least in part on a current location of the resource and the first location, wherein, for each resource of the subset of the first plurality of resources, the time of arrival corresponds to the preparation time.

8. The computer-implemented method of claim 7, further comprising determining a transport mode for each resource of the first plurality of resources, wherein the transport mode is associated with a rate of transport, and wherein generating the time of arrival is based at least in part on the current location of the resource and first location, and the rate of transport.

9. The computer-implemented method of claim 5, further comprising:

causing transmission of the offer to the first resource of the subset of the first plurality of resources;

detecting acceptance of the offer by the first resource; and based at least in part on detecting acceptance of the offer by the first resource, releasing the second resource of the subset of the first plurality of resources, wherein releasing the second resource comprises updating a record of the second resource to indicate that the second resource is unreserved.

10. The computer-implemented method of claim 5, wherein the service comprises transmission of a data packet from a first network location to a second network location, and wherein the first request includes: (i) a source network address identifying the first network location, and (ii) a destination network address identifying the second network location for a destination device to receive the data packet.

11. The computer-implemented method of claim 10, further comprising:

generating a forwarding table entry; and causing the forwarding table entry to be added to a forwarding table for a network controller receiving the data packet.

12. A system comprising:

a computer-readable memory storing executable instructions; and one or more computer processors in communication with the computer-readable memory, wherein the one or more computer processors are configured to execute the executable instructions to at least:

receive, from a communication device, a first request for a service at a first location;

identify, from a data store, a first plurality of resources within a threshold distance of the first location, wherein each resource of the first plurality of resources is associated with an individual resource probability of a plurality of individual resource probabilities that the resource will accept an offer to fulfill the first request, wherein the individual resource probability is generated by a machine learning model trained on historical resource behavior information;

estimate, by the machine learning model, a cumulative probability that at least one resource of a subset of the first plurality of resources will accept the offer to fulfill the first request, wherein the cumulative probability is estimated based at least in part on aggregating a subset of the plurality of individual resource probabilities associated with the subset of the first plurality of resources;

determine that the cumulative probability corresponds to an acceptance threshold;

based at least in part on determining that the cumulative probability corresponds to the acceptance threshold, reserve the subset of the first plurality of resources;

transmit, to the communication device, availability of at least a first resource and a second resource of the subset of the first plurality of resources to satisfy the first request;

detect confirmation of the first request by the communication device; and based at least in part on detecting confirmation of the first request by the communication device, release a third resource of the subset of the first plurality of resources, wherein to release the third resource, the one or more computer processors are configured to execute the executable instructions to update a record of the third resource to indicate that the third resource is unreserved.

13. The system of claim 12, wherein the plurality of individual resource probabilities comprises a plurality of first individual resource probabilities, wherein the one or more computer processors are configured to execute further executable instructions to at least, prior to detecting the confirmation:

receive a second request for the service at the first location; and identify, from the data store, a second plurality of resources within the threshold distance of the first location, wherein each resource of the second plurality of resources is associated with a second individual resource probability of a plurality of second individual resource probabilities that the resource of the second plurality of resources will accept the offer to fulfill the second request, wherein the second individual resource probability is generated by the machine learning model, wherein the second plurality of resources is different from the first plurality of resources.

14. The system of claim 12, wherein the one or more computer processors are configured to execute further executable instructions to at least:

estimate a preparation time that an item associated with the first request will be available at the first location based at least in part on a preparation period associated with the first location; and for each resource of the first plurality of resources, generate a time of arrival at the first location for the resource based at least in part on a current location of the resource and the first location, wherein, for each resource of the subset of the first plurality of resources, the time of arrival corresponds to the preparation time.

15. The system of claim 12, wherein the one or more computer processors are configured to execute further executable instructions to at least:

cause transmission of the offer to the first resource of the subset of the first plurality of resources;

detect acceptance of the offer by the first resource; and based at least in part on detecting acceptance of the offer by the first resource, release the second resource of the subset of the first plurality of resources, wherein to release the second resource, the one or more computer processors are configured to execute the executable instructions to update a record of the second resource to indicate that the second resource is unreserved.

16. The system of claim 12, wherein the service comprises transmission of a data packet from a first network location to a second network location, and wherein the first request includes: (i) a source network address identifying the first network location, and (ii) a destination network address identifying the second network location for a destination device to receive the data packet.

17. The system of claim 16, wherein the one or more computer processors are configured to execute further executable instructions to at least:

generate a forwarding table entry; and cause the forwarding table entry to be added to a forwarding table for a network controller receiving the data packet.

18. The system of claim 12, wherein an item associated with the first request comprises a physical object, and wherein the first request includes a source address identifying a current location of the physical object and a destination address identifying a destination location of the physical object.

19. The system of claim 18, wherein the one or more computer processors are configured to execute further executable instructions to at least adjust an operational state of processing equipment at the current location of the physical object to direct the physical object to the destination location.

20. The system of claim 12, wherein the cumulative probability comprises a first cumulative probability, wherein the subset of the plurality of individual resource probabilities comprises a first subset of the plurality of individual resource probabilities, wherein the one or more computer processors are configured to execute further executable instructions to at least:

estimating, by the machine learning model, a second cumulative probability that at least one resource of an initial subset of the first plurality of resources will accept the offer to fulfill the first request, wherein the second cumulative probability is estimated based at least in part on aggregating an initial subset of the plurality of individual resource probabilities associated with the initial subset of the first plurality of resources determine that the second cumulative probability does not correspond to the acceptance threshold; and identify a fourth resource of the first plurality of resources to combine with the initial subset of the first plurality of resources, wherein the subset of the first plurality of resources includes the fourth resource and the initial subset of the first plurality of resources.

* * * * *